United States Patent
Yang et al.

(10) Patent No.: US 10,039,060 B2
(45) Date of Patent: Jul. 31, 2018

(54) APPARATUS AND METHOD FOR SETTING ANTENNAS OF MOBILE DEVICE, AND MOBILE DEVICE

(71) Applicant: HISENSE MOBILE COMMUNICATIONS TECHNOLOGY CO., LTD., Qingdao (CN)

(72) Inventors: Chuanqing Yang, Qingdao (CN); Changsheng Zhou, Qingdao (CN); Bin Zheng, Qingdao (CN); Zizhi Sun, Qingdao (CN); Shidong Shang, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 0 days.

(21) Appl. No.: 15/475,764

(22) Filed: Mar. 31, 2017

(65) Prior Publication Data

US 2017/0208551 A1 Jul. 20, 2017

Related U.S. Application Data

(63) Continuation of application No. 15/055,051, filed on Feb. 26, 2016, now Pat. No. 9,648,566.

(30) Foreign Application Priority Data

Sep. 30, 2015 (CN) .......................... 2015 1 0645045

(51) Int. Cl.
H04M 1/00 (2006.01)
H04W 52/02 (2009.01)
(Continued)

(52) U.S. Cl.
CPC .......... *H04W 52/0251* (2013.01); *H04B 7/04* (2013.01); *H04W 8/22* (2013.01);
(Continued)

(58) Field of Classification Search
CPC ......... H04M 1/72522; H04M 1/72519; H04W 16/28; H04W 52/0251; H04W 72/1274;
(Continued)

(56) References Cited

U.S. PATENT DOCUMENTS 6,661,803 B1 * 12/2003 Choi .................... H04L 12/5602
370/229
9,763,192 B1 * 9/2017 Vivanco ............ H04W 52/0251
(Continued)

FOREIGN PATENT DOCUMENTS

CN 104159227 11/2014
CN 104219377 12/2014

*Primary Examiner* — Danh Le
(74) *Attorney, Agent, or Firm* — Harness, Dickey & Pierce, P.L.C.

(57) ABSTRACT

The disclosure provides an apparatus and method for setting antennas of a mobile device, and a mobile device, and the apparatus includes: one or more processors; and a memory, where the memory is configured to store one or more computer readable program codes, and the one or more processors are configured to execute the one or more computer readable program codes to perform operations of: functioning, by the mobile device, as a Wi-Fi relay to be connected with both a wireless access point and an electronic device, wherein the mobile device is provided with at least two Wi-Fi antennas to receive and transmit Wi-Fi data; determining a communication type of communication between the wireless access point and the electronic device; and adjusting the number of receiving antennas and the number of transmitting antennas among the Wi-Fi antennas according to the communication type.

16 Claims, 4 Drawing Sheets

(51) Int. Cl.
*H04B 7/04* (2017.01)
*H04W 72/12* (2009.01)
*H04W 8/22* (2009.01)
*H04W 24/08* (2009.01)
*H04W 84/12* (2009.01)
*H04W 88/04* (2009.01)
*H04W 88/08* (2009.01)
*H04B 7/0404* (2017.01)

(52) U.S. Cl.
CPC ....... *H04W 24/08* (2013.01); *H04W 72/1284* (2013.01); *H04W 72/1289* (2013.01); *H04B 7/0404* (2013.01); *H04W 84/12* (2013.01); *H04W 88/04* (2013.01); *H04W 88/08* (2013.01); *Y02D 70/00* (2018.01); *Y02D 70/142* (2018.01); *Y02D 70/144* (2018.01); *Y02D 70/22* (2018.01); *Y02D 70/26* (2018.01); *Y02D 70/444* (2018.01)

(58) Field of Classification Search
CPC ......... H04W 72/1284; H04W 72/1289; H04W 24/08; H04W 84/12; H04L 1/06
USPC ........ 455/556.1, 562.1, 550.1, 11.1; 370/334
See application file for complete search history.

(56) References Cited

U.S. PATENT DOCUMENTS

| | | | |
|---|---|---|---|
| 2006/0274703 A1* | 12/2006 | Connelly | H04L 41/0622 370/338 |
| 2010/0138919 A1* | 6/2010 | Peng | H04L 29/12009 726/22 |
| 2010/0234071 A1* | 9/2010 | Shabtay | H04B 7/0408 455/562.1 |
| 2011/0256893 A1 | 10/2011 | Athley et al. | |
| 2014/0056209 A1* | 2/2014 | Park | H04W 88/04 370/315 |
| 2014/0192716 A1* | 7/2014 | Pantelidou | H04W 28/02 370/328 |
| 2014/0370830 A1* | 12/2014 | Steer | H04W 52/18 455/127.1 |
| 2015/0131529 A1* | 5/2015 | Zhou | H04W 84/18 370/328 |
| 2015/0372919 A1* | 12/2015 | Zhou | H04L 47/12 370/236 |
| 2015/0373639 A1* | 12/2015 | Zhou | H04W 52/02 370/311 |

\* cited by examiner

APPARATUS AND METHOD FOR SETTING ANTENNAS OF MOBILE DEVICE, AND MOBILE DEVICE

CROSS-REFERENCE TO RELATED APPLICATIONS

This application is a continuation of the U.S. application Ser. No. 15/055,051 filed Feb. 26, 2016, which claims the benefit and priority of Chinese Patent Application No. 201510645045.9 filed Sep. 30, 2015. The entire disclosures of the above applications are incorporated herein by reference.

FIELD

The present disclosure relates to the field of mobile communications and particularly to an apparatus and method for setting antennas of a mobile device, and a mobile device.

BACKGROUND

This section provides background information related to the present disclosure which is not necessarily prior art.

Along with the improving level of our life, wireless signals, e.g., Wireless Fidelity (Wi-Fi), have been widely applied to the various aspects of our life due to their convenience and expeditiousness.

Since a mobile device is powered by a battery, the battery may be drained rapidly by the mobile device operating with high power consumption so that the mobile device will keep on operating for a shorter period of time.

For example, for an access to Wi-Fi, the mobile device is typically configured with a preset number of antennas to transmit and receive data.

If a larger number of antennas are configured for higher Wi-Fi performance, then some antenna resources and power may be wasted in many cases; and the body of a user subject to some electromagnetic radiation from high-power Wi-Fi may be hurt.

If a smaller number of antennas are configured for lower Wi-Fi performance, then data may be refrained from being received and transmitted in some cases.

SUMMARY

This section provides a general summary of the disclosure, and is not a comprehensive disclosure of its full scope or all of its features.

An embodiment of the disclosure further provides an apparatus for setting antennas of a mobile device, applicable to the mobile device, the apparatus including:
one or more processors; and
a memory, wherein:
the memory is configured to store one or more computer readable program codes, and the one or more processors are configured to execute the one or more computer readable program codes to perform the operations of:
functioning, by the mobile device, as a Wi-Fi relay to be connected with both a wireless access point and an electronic device, where the mobile device is provided with at least two Wi-Fi antennas to receive and transmit Wi-Fi data;
determining a communication type of communication between the wireless access point and the electronic device; and
adjusting the number of receiving antennas and the number of transmitting antennas among the Wi-Fi antennas according to the communication type;
wherein the operation of determining the communication type of communication between the wireless access point and the electronic device comprises:
counting proportions of respective protocols in data packets transmitted between the wireless access point and the electronic device, and
determining the communication type of communication between the wireless access point and the electronic device based upon the proportions.

An embodiment of the disclosure further provides a mobile device including an apparatus for setting antennas, the apparatus including:
one or more processors; and
a memory, wherein:
the memory is configured to store one or more computer readable program codes, and the one or more processors are configured to execute the one or more computer readable program codes to perform the operations of:
functioning, by the mobile device, as a Wi-Fi relay to be connected with both a wireless access point and an electronic device, where the mobile device is provided with at least two Wi-Fi antennas to receive and transmit Wi-Fi data;
determining a communication type of communication between the wireless access point and the electronic device; and
adjusting the number of receiving antennas and the number of transmitting antennas among the Wi-Fi antennas according to the communication type;
wherein the operation of determining the communication type of communication between the wireless access point and the electronic device comprises:
counting proportions of respective protocols in data packets transmitted between the wireless access point and the electronic device, and
determining the communication type of communication between the wireless access point and the electronic device based upon the proportions.

An embodiment of the disclosure provides a method for setting antennas of a mobile device, the method including:
functioning, by the mobile device, as a Wi-Fi relay to be connected with both a wireless access point and an electronic device, where the mobile device is provided with at least two Wi-Fi antennas to receive and transmit Wi-Fi data;
determining a communication type of communication between the wireless access point and the electronic device; and
adjusting the number of receiving antennas and the number of transmitting antennas among the Wi-Fi antennas according to the communication type;
wherein the operation of determining the communication type of communication between the wireless access point and the electronic device comprises:
counting proportions of respective protocols in data packets transmitted between the wireless access point and the electronic device, and
determining the communication type of communication between the wireless access point and the electronic device based upon the proportions.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
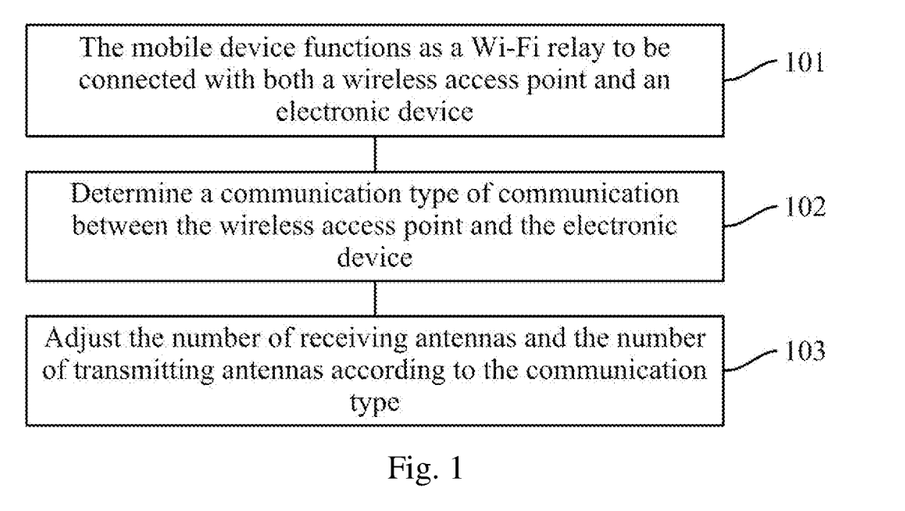
FIG. 1 is a flow chart of a method for setting antennas of a mobile device according to an embodiment of the disclosure.

Referring to FIG. 1 illustrating a flow chart of a method for setting antennas of a mobile device according to an embodiment of the disclosure, the method includes the following operations:

Operation 101: the mobile device functions as a Wi-Fi relay to be connected with both a wireless access point and an electronic device.

It shall be noted that the embodiment of the disclosure can be applicable to an operating system of the mobile device, e.g., a handset, a tablet computer, a smart wearable device (e.g., a smart watch), etc., all of which are provided with at least two Wi-Fi antennas to receive and transmit Wi-Fi data.

These mobile devices generally support Windows Phone, Android, IOS, Windows, and other operating systems, and typically can be connected with the wireless Access Point (AP), e.g., a router, through Wireless Fidelity (Wi-Fi).

Figure 2:
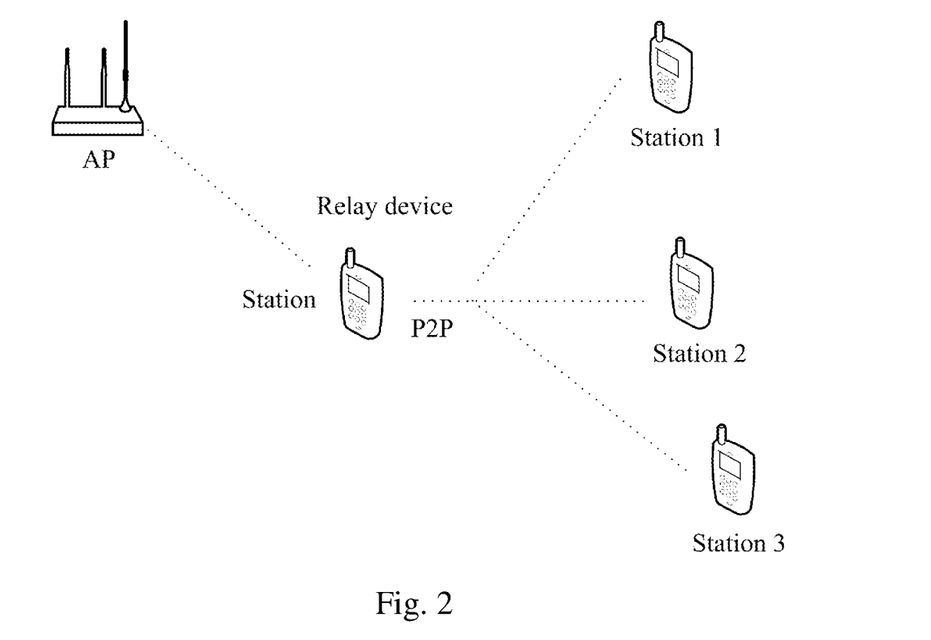
FIG. 2 is a schematic diagram of topological structure of a relay system according to an embodiment of the disclosure.

As illustrated in FIG. 2, the AP is such a special node in a wireless network that can access a base station, and through which another type of node in the wireless network can communicate with the inside and the outside of the wireless network.

Wi-Fi of the mobile device typically configures the mobile device as a station or a softAP, or with P2P.

Particularly the station refers to such a device connected to the wireless network that can communicate with a device in the wireless network or with the outside of the wireless network through an AP.

The softAP refers to the mobile device capable of functioning as the AP to be a router to which another station may be connected.

The P2P (Peer-to-Peer), also referred to as Wi-Fi Direct, can enable two Wi-Fi devices to be connected directly and to communicate with each other without any AP.

In the embodiment of the disclosure, the getWifiState( ) function in WifiManager can be invoked to determine whether the mobile device is connected to an AP.

In an embodiment, if a station node being started is detected, then the API interface getNetworkInfo( ) provided by ConnectivityManager can be invoked by inputting ConnectivityManager.TYPE_WIFI as a parameter to determine whether the station node is connected to an AP.

If the returned NetworkInfo object is not Null, and isConnected( ) is true, then it will be determined that the station node is connected to an AP.

If it is determined that the station node is connected to an AP, then it will be determined that the mobile device is connected to the wireless access point.

If it is determined that no station node is started or the station node is not connected to an AP, then an alert will be generated that Connect to the wireless access point, e.g., "Enable Wi-Fi and connect to a router".

As illustrated in FIG. 2, if Wi-Fi is connected to an active AP, then a relay instruction will be sent to the Wi-Fi module to start Wi-Fi relaying.

In an implementation, a first channel over which the wireless access point, to which the station node is connected, operates can be detected;

Logon information for logging onto the mobile device can be obtained, where the logon information includes a service set identifier and a password;

A second channel without interference to and from the first channel can be determined by the delay channel arithmetic;

A first length of the service set identifier, and a second length of the password can be calculated;

The second channel, the service set identifier, the first length, the password, and the second length can be encapsulated in the relay instruction; and The relay instruction can be sent in the group mode of the Wi-Fi P2P nodes so that the service set identifier is broadcasted as per the first length over the second channel.

Furthermore if the Wi-Fi station is started and connected with the AP, then the first channel of the AP to which the station is connected can be determined, and the relay instruction can be sent over the second channel without interference with the first channel when the P2P mode is activated.

As to the channels, frequencies of the different channels are as follows:

| | | |
|---|---|---|
| Freq = 2412 (Channel 1) | Freq = 2417 (Channel 2) | Freq = 2422 (Channel 3) |
| Freq = 2427 (Channel 4) | Freq = 2432 (Channel 5) | Freq = 2437 (Channel 6) |
| Freq = 2442 (Channel 7) | Freq = 2447 (Channel 8) | Freq = 2452 (Channel 9) |
| Freq = 2457 (Channel 10) | Freq = 2462 (Channel 11) | Freq = 2467 (Channel 12) |
| Freq = 2472 (Channel 13) | | |

Figure 3:
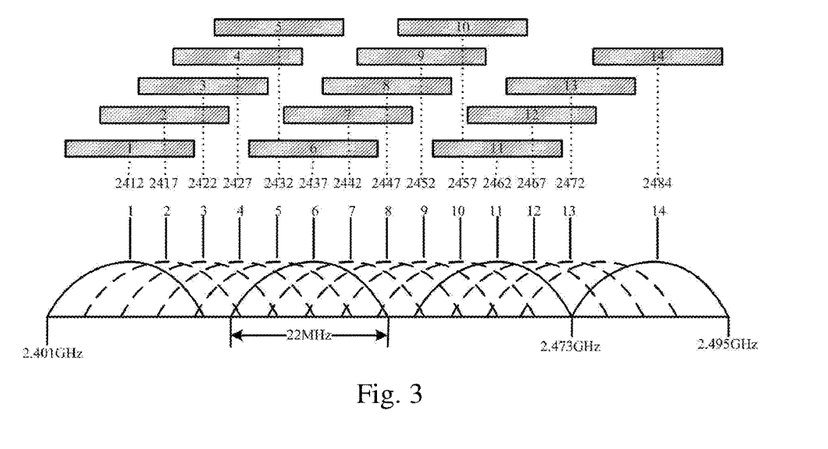
FIG. 3 is a schematic diagram of distribution of 2.4G channels.

As illustrated in FIG. 3, the spectrum of the channels 1 to 14 in the 2.4G band is a gradient matrix, and from the perspective of their bands, these channels are divided into three separate bands in total, and the channels in the respective separate bands interfere with each other, where the bands are arranged as follows:

Zone 1: Channels 1 to 5
Zone 2: Channels 6 to 10
Zone 3: Channels 11 to 14

From the perspective of isolating the bands, there are five isolation intervals in total, and the channels in the isolation intervals do not interfere with each other, where the intervals are arranged as follows:

Class 1: 1, 6, 11
Class 2: 2, 7, 12
Class 3: 3, 8, 13
Class 4: 4, 9
Class: 5, 10

After the second channel to be configured is determined, the user is asked on a User Interface (UI) to enter the service set identifier (SSID) and the password of the relay device (i.e., the mobile device).

If the user enters the SSID and the password on the UI, then the SSID and the password will be used; otherwise, a default SSID and a default password will be used.

The first length of the SSID, and the second length of the password are calculated for sending the relay instruction.

There are two existing P2P modes including the P2P group mode and the P2P client mode.

P2P enables a number of Wi-Fi devices to constitute a network (a P2P network, also referred to as a P2P group), and to communicate with each other, without any AP.

Before the P2P group is created, all the smart terminals are respective P2P devices.

After these P2P devices negotiate about P2P, one of the devices plays the role of a Group Owner (GO) (i.e., acts as an AP), and the other devices play the role of clients.

The original P2P group function is:
p2p_ctrl_group_add(struct wpa_supplicant *wpa_s, char *cmd)

In this P2P group function, none of the channel, the SSID, the password, and the other parameters can be transmitted.

In the embodiment of the disclosure, the Wi-Fi protocol stack is modified by forcibly setting the P2P mode to the group mode in which the SSID and the password can be set as desirable to the user so that the relay device (i.e., mobile device) located by an external scanning electronic device can be identified by the SSID, and secured by the password.

The P2P_GROUP_ADD instruction is extended in the Wi-Fi protocol stack Wpa_supplicant of the system:
wpas_p2p_group_add_with_ssid(wpa_s, 1, freq, ht40, ssid, passphrase, ssid_len, passphrase_len)

Where freq represents the second channel, ssid_len represents the first length, passphrase represents the password, and passphrase_len represents the second length.

The channel, the SSID, the password, and the other parameters can be sent in the extended P2P group function.

After the relay instruction is sent, the relay device (i.e., the mobile device) sends a broadcast frame carrying the SSID, and the other scanning electronic device locating the relay device can use the SSID and the password for connection.

Moreover a packet forwarding function can be started to enable in the mobile device a data packet to be forwarded between different Wi-Fi nodes.

In an implementation, the packet forwarding function (which refers to that a data packet is allowed to be forwarded from one device to another device) can be started using the echo attribute value, e.g.:
echo 1 >/proc/sys/net/ipv4/ip_forward In the embodiment of the disclosure, the packet forwarding function can be started to forward a data packet between the station and the P2P node.

Configuration information of packet forwarding can be sent to the Wi-Fi module so that a data packet is forwarded between the station and the P2P node.

In a real application, the address table service iptables of the system can be invoked to send a routing table to the Wi-Fi module, where the routing table includes routes to a first IP address of the P2P node, and a second IP address of the station node; and The address table service iptables of the system can be invoked to send configuration information of the Network Address Translation (NAT) function to the Wi-Fi module, where the source IP address and the destination IP address of the IP message are modified automatically by the NAT function to translate the first IP address of the P2P node Of course a prior routing table can be further removed before the routing table and the NAT function are sent.

The configuration information of iptables and NAT is as follows:

```
#remove old rules (The prior routing table is removed)
iptables -F
iptables -t filter -F
iptables -t nat -F
# Bring up NAT rules
iptables -t nat -A POSTROUTING -s 192.168.49.0/24 -d 0.0.0.0/0 -j MASQUERADE
```

Particularly if the IP segment of the relay device (i.e., the mobile device) is 192.168.49.0, then "Bring up NAT rules" can be sent to re-encapsulate and de-encapsulate the data packet with the source address being the network segment of 192.168.49.0/24 by translating the source address to 0.0.0.0/0, and to forward the data packet to the station.

In an embodiment of the disclosure, the method can further include the following operations:

Configuration information of a Domain Name System (DNS) can be sent to the Wi-Fi module so that the data packet received by the P2P node is forwarded.

In an implementation, the address table service iptables in the system can be invoked to send the address of a gateway of the DNS based on the Transport Control Protocol (TCP) to the Wi-Fi module in the command format of:
iptables -t nat -I PREROUTING -i (the name of the relay device) -p tcp --dport 53 -j DNAT --to-destination (the router gateway)

Also the address table service iptables in the system can be invoked to send the address of the gateway of the DNS based on the User Datagram Protocol (UDP) of the open system interconnection protocol to the WI-Fi module in the command format of:
iptables -t nat -I PREROUTING -i (the name of the relay device) -p udp --dport 53 -j DNAT --to-destination (the router gateway)

As described above, the DNS gateway addresses in the TCP and the UDP are added to the relay device (i.e., the mobile device), and after the DNS is configured, the input IP address is parsed by the DNS server for communication over the network.

Operation 102: a communication type of communication between the wireless access point and the electronic device is determined.

In an implementation, data packets of a protocol type transmitted between the wireless access point and the electronic device can b counted; and If the count of data packets of the protocol type exceeds a preset count threshold, then the communication type of communication between the wireless access point and the electronic device is determined as the protocol type.

Furthermore headers of all the data packets over the network through Wi-Fi can be parsed, the data packets can be counted in real time, the proportions of respective protocols can be determined and then reported, based on which the communication type can be determined.

Particularly the protocols include the File Transfer Protocol (FTP) the Real-time Transport Protocol (RTP), the Wireless Application Protocol (WAP), the Hypertext Transfer Protocol (HTTP), etc.

Figure 4:
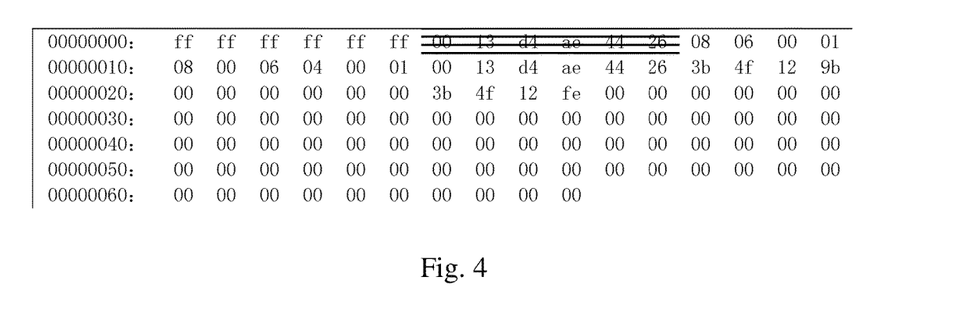
FIG. 4 is an exemplary diagram of a header of an FTP data packet.

Taking the FTP as an example, a header is treated as follows:

FIG. 4 illustrates an example of the format of an FTP header, where first 12 bytes in a first row represent a destination hardware address and a source address in a Medium Access Control (MAC) frame header of the protocol.

Immediately following two bytes represent a type field in the MAC frame header to identify a type of the protocol received from an upper layer, where "08 06" indicates that a data packet of the FTP type is received from the upper layer.

The other data represent the contents of the data packet.

"00 01" indicates that the hardware type is the Ethernet.

"08 00" indicates that the protocol type in use is the IP type.

"06 04" indicates that the length of the hardware address and the length of the protocol address are 6 and 4 bytes respectively.

"00 01" indicates an ARP request operation to be performed.

"00 13 d4 ae 44 26" and "3b 4f 12 9b" represent the source hardware address and the source protocol address (59.79.18.155).

"00 00 00 00 00 00" and "3b 4f 12 fe" represent the destination hardware address and the destination protocol address (59.79.18.254).

The remaining zero-valued data are for the padded area.

In summary, it can be determined that the data packet is a request message in the FTP.

Operation 103: the number of receiving antennas and the number of transmitting antennas are adjusted according to the communication type.

In the embodiment of the disclosure, the number of receiving antennas and the number of transmitting antennas can be adjusted dynamically according to the communication type to adapt relayed communication.

In order to lower resource consumption of the system, it can be determined whether traffic of communication between the wireless access point and the electronic device is above a preset traffic threshold; and The number of receiving antennas and/or the number of transmitting antennas among the Wi-Fi antennas are/is adjusted according to a result of the determination and/or the communication type.

In a case that the number of receiving antennas and/or the number of transmitting antennas among the Wi-Fi antennas are/is adjusted according to the result of the determination:

The traffic threshold includes a first traffic sub-threshold (e.g., 20 KB/s) and a second traffic sub-threshold (e.g., 1 MB/s), where the first traffic sub-threshold is less than the second traffic sub-threshold; and If the traffic of communication is above the first traffic sub-threshold, then the number of receiving antennas and the number of transmitting antennas among the Wi-Fi antennas can be adjusted according to the communication type.

If the traffic of communication is above the second traffic sub-threshold, then the number of receiving antennas among the Wi-Fi antennas can be set to a first number, and the number of transmitting antennas among the Wi-Fi antennas can be set to the first number;

Where the first number is above or equal to a preset first number threshold (e.g., 1 or 2), and the first number threshold is a larger number, e.g., 2 or 3.

In a case that the number of receiving antennas and the number of transmitting antennas among the Wi-Fi antennas are adjusted according to the communication type:

In an example, if the communication type is a first type, then the number of receiving antennas among the Wi-Fi antennas is set to a first number; and The number of transmitting antennas among the Wi-Fi antennas is set to the first number;

Where the first number (e.g., 2 or 3) is above or equal to a preset first number threshold, and the first number threshold is a larger number.

For example, the first type includes a download type or an upload type, and if data are uploaded or downloaded at a high speed using the FTP, then both the number of transmitting antennas and the number of receiving antennas of the relay device are 2 (the first number), and a plurality of spatial data streams are created for full-speed forwarding.

In an example, if the communication type is a second type, then it is determined whether download traffic is above a preset download threshold; and If so, then the number of receiving antennas among the Wi-Fi antennas is set to a first number, and the number of transmitting antennas among the Wi-Fi antennas is set to a second number;

Otherwise, the number of receiving antennas among the Wi-Fi antennas is set to a second number, and the number of transmitting antennas among the Wi-Fi antennas is set to the second number;

Where the first number (e.g., 2 or 3) is above or equal to a preset first number threshold (e.g., 1 or 2), and the first number threshold is a larger number; and the second number (e.g., 1 or 2), is below or equal to a preset second number threshold (e.g., 2 or 3), and the second number threshold is a smaller number. For example, the second type includes a video browse type, and if different types of video are watched in video streams, then the numbers of antennas can be adjusted dynamically according to traffic of the video due to asymmetric upload and download so that if there is a demand for high-speed traffic, then the relay device will be provided with 2 (the first number) transmitting antennas and 1 (the second number) receiving antenna to lower power consumption in reception; and if there is a demand for low traffic, then the relay device will be provided with 1 (the second number) transmitting antenna and 1 (the second number) receiving antenna to lower power consumption in transmission.

In another example, if the communication type is a third type, then the number of receiving antennas among the Wi-Fi antennas is set to a second number; and The number of transmitting antennas among the Wi-Fi antennas is set to the second number;

Where the second number (e.g., 1 or 2) is below or equal to a preset second number threshold (e.g., 2 or 3), and the second number threshold is a smaller number.

For example, the third type includes a webpage browse type, and if the user only conducts webpage browsing, or other low-traffic communication, then the relay device will be provided with 1 (the second number) transmitting antenna and 1 (the second number) receiving antenna to lower power consumption in transmission.

Of course the antenna adjustment schemes above are merely illustrative, but the antennas can be adjusted otherwise dependent upon a real condition to implement the embodiment of the disclosure, for example, 3 transmitting antennas and 3 receiving antennas are arranged, and 1 or 2 or 3 transmitting antennas are selected dynamically for traffic of video, although the embodiment of the disclosure will not be limited thereto. Moreover those skilled in the art can adjust the antennas otherwise as required in reality than the antenna adjustment schemes above, although the embodiment of the disclosure will not be limited thereto.

In a real application, the number of transmitting antennas and the number of receiving antennas can be adjusted using a wl instruction as exemplified as follows:

```
wl rxchain 1    /*The number of receiving antennas is set to 1*/
wl txchain 1    /*The number of transmitting antennas is set to 1*/
wl rxchain 2    /*The number of receiving antennas is set to 2*/
wl txchain 2    /*The number of transmitting antennas is set to 2*/
```

In the embodiment of the disclosure, the numbers of receiving antennas and of transmitting antennas are adjusted dynamically according to the type of the traffic to lower the power of the mobile device, and the power consumption of the battery, and to prolong the period of time of the mobile device in service while the mobile device is functionally normally as a relay, and the body of the user can be alleviated from being hurt, due to the lower power.

Figure 5:
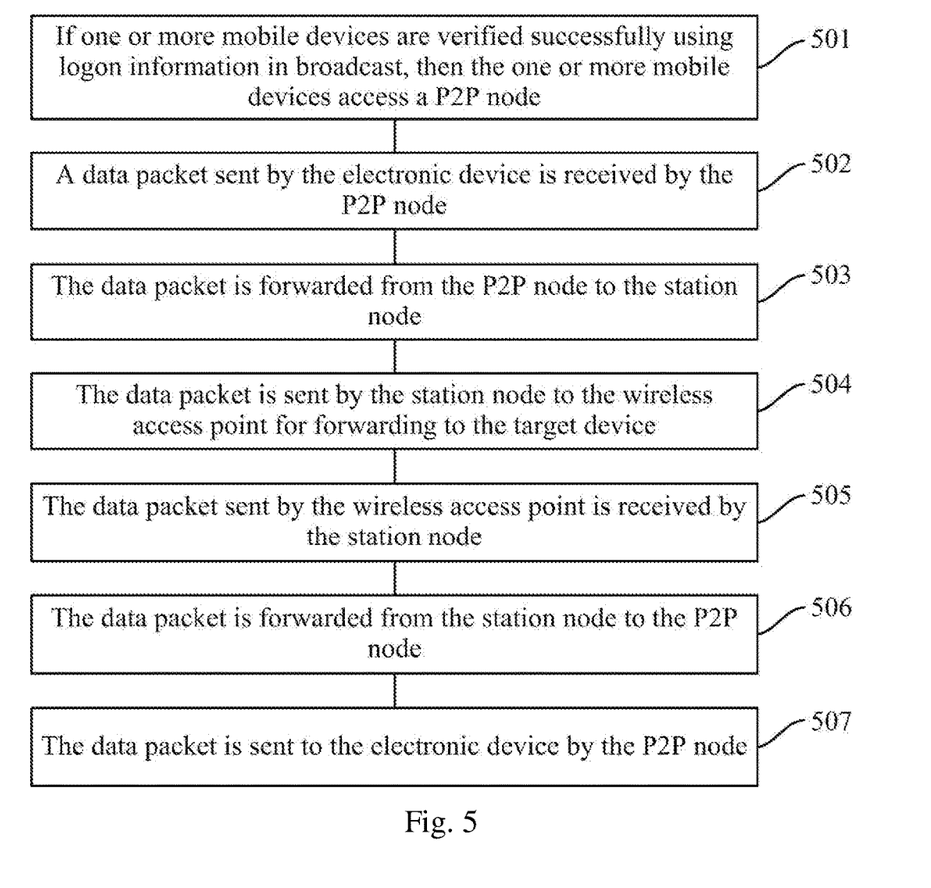
FIG. 5 is a flow chart of a method for relaying by a mobile device according to an embodiment of the disclosure.

FIG. 5 illustrates a flow chart of a method for relaying by a mobile device according to an embodiment of the disclosure, which can include the following operations:

Operation 501: if one or more mobile devices are verified successfully using logon information in broadcast, then the one or more mobile devices access a P2P node;

In an implementation, a relay device (i.e., a mobile device) can be regarded as an AP to broadcast a beacon frame periodically so that another scanning station device locating the beacon frame can be provided with an SSID of the relay device (i.e., the mobile device).

If a request sent by one or more electronic devices for a service set identifier in the logon information is received, then a response message of Challenge Text is returned to the one or more electronic devices;

If a connection request sent by the one or more electronic devices is received, then a password in the connection request is verified for consistency with a password in the logon information according to a second length of the password in the logon information; and If the passwords are consistent, then the one or more electronic devices, e.g., electronic devices of Station 1, Station 2, and Station 3, as illustrated in FIG. 2, access the relay device.

Operation 502: a data packet sent by the electronic device is received by the P2P node.

If the connected electronic device communicates with an external target device, then the electronic device sends the data packet to the relay device (i.e., the mobile device).

Operation 503: the data packet is forwarded from the P2P node to the station node;

In an implementation, it is determined whether a source address of the data packet is a first IP address of the P2P node, e.g., 192.168.49.0, and if so, then the first IP address is translated to a destination IP address of 0.0.0.0 based upon configuration information of NAT; and A routing table is searched for a second IP address corresponding to the first IP address, and since a packet forwarding function is started in advance, the translated data packet from the destination IP address is forwarded to a station node at the IP address.

Operation 504: the data packet is sent by the station node to the wireless access point for forwarding to the target device;

In a real application, the data packet includes Uniform Resource Locator (URL) information, and the wireless access point maps the URL information to an IP address through a Domain Name System (DNS), and forwards the data packet to the target device at the IP address, e.g., a web server, through the base station illustrated in FIG. 2.

It shall be noted that the station operates over a first channel, and the P2P node operates over a second channel, thus avoiding interference to each other.

Operation 505: the data packet sent by the wireless access point is received by the station node.

If the external target device communicates with the connected electronic device, then the target device sends a data packet to the relay device (i.e., the mobile device) through the base station.

Operation 506: the data packet is forwarded from the station node to the P2P node;

In an implementation, if the second IP address of the station node from which the data packet originates is determined, and the routing table is searched for the first IP address corresponding to the second IP address, then the data packet can be forwarded to the P2P node at the first IP address.

Operation 507: the data packet is sent to the electronic device by the P2P node.

The relay device sends the data packet of the external target device to the electronic device through the P2P node to thereby relay the data.

It shall be noted that the station operates over the first channel, and the P2P node operates over the second channel, thus avoiding interference to each other.

It shall be noted that for the sake of a concise description, the embodiments of the method have been described as a series of actions in combination, but those skilled in the art shall appreciate that the embodiment of the disclosure will not be limited to the described order of the actions because some of the operations may be performed in another order or concurrently dependent upon the embodiments of the disclosure. Secondly those skilled in the art shall also appreciate that all the embodiments described here are preferred embodiments, but all the actions involved in the embodiments may not necessarily be necessary to the embodiments of the disclosure.

Figure 6:
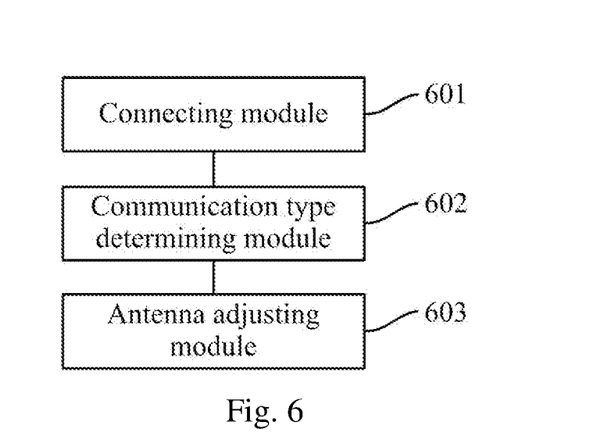
FIG. 6 is a schematic structural diagram of a device for setting antennas of a mobile device according to an embodiment of the disclosure.

FIG. 6 illustrates a structural diagram of an apparatus for setting antennas of a mobile device according to an embodiment of the disclosure, applicable to the mobile device, where the apparatus can include:

One or more processors; and

A memory, where:

The memory is configured to store one or more computer readable program codes, and the one or more processors are configured to execute the one or more computer readable program codes to function of the following modules:

A connecting module 601 is configured to function as a Wi-Fi relay to be connected with both a wireless access point and an electronic device, where the mobile device is provided with at least two Wi-Fi antennas to receive and transmit Wi-Fi data;

A communication type determining module 602 is configured to determine a communication type of communication between the wireless access point and the electronic device; and An antenna adjusting module 603 is configured to adjust the number of receiving antennas and the number of transmitting antennas among the Wi-Fi antennas according to the communication type.

In an embodiment of the disclosure, the antenna adjusting module 603 can include the following sub-modules:

A traffic determining sub-module is configured to determine whether traffic of communication between the wireless access point and the electronic device is above a preset traffic threshold; and A traffic controlling sub-module is configured to adjust the number of receiving antennas and/or the number of transmitting antennas among the Wi-Fi antennas according to a result of the determination and/or the communication type.

In an embodiment of the disclosure, the communication type determining module 602 can include the following sub-modules:

A protocol type counting sub-module is configured to count data packets of a protocol type transmitted between the wireless access point and the electronic device; and A determining sub-module is configured to determine the communication type of communication between the wireless access point and the electronic device as the protocol type if the count of data packets of the protocol type is above a preset count threshold.

In an embodiment of the disclosure, the antenna adjusting module 603 can include the following sub-modules:

A first setting sub-module is configured to set the number of receiving antennas among the Wi-Fi antennas to a first number if the communication type is a first type; and A second setting sub-module is configured to set the number of transmitting antennas among the Wi-Fi antennas to the first number;

Where the first number is above or at a preset first number threshold, and the first type includes a downlink type or an upload type.

In an embodiment of the disclosure, the antenna adjusting module 603 can include the following sub-modules:

A downlink traffic determining sub-module is configured to determine whether downlink traffic is above a preset download threshold if the communication type is a second type; and if so, to invoke a third setting sub-module; otherwise, to invoke a fourth setting sub-module;

The third setting sub-module is configured to set the number of receiving antennas among the Wi-Fi antennas to a first number, and to set the number of transmitting antennas among the Wi-Fi antennas to a second number; and The fourth setting sub-module is configured to set the number of receiving antennas among the Wi-Fi antennas to the second number, and to set the number of transmitting antennas among the Wi-Fi antennas to the second number;

Where the first number is above or equal to a preset first number threshold, the second number is below or equal to a preset second number threshold, and the first number threshold is more than the second number threshold; and The second type includes a video browse type.

In an embodiment of the disclosure, the antenna adjusting module 603 can include the following sub-modules:

A fifth setting sub-module is configured to set the number of receiving antennas among the Wi-Fi antennas to a second number if the communication type is a third type; and A sixth setting sub-module is configured to set the number of transmitting antennas among the Wi-Fi antennas to the second number;

Where the second number is below or equal to a preset second number threshold, and the third type includes a webpage browse type.

In an embodiment of the disclosure, the traffic threshold includes a first traffic sub-threshold and a second traffic sub-threshold, and the first traffic sub-threshold is less than the second traffic sub-threshold; and The traffic controlling sub-module can include the following units:

A first setting unit is configured to adjust the number of receiving antennas and the number of transmitting antennas among the Wi-Fi antennas according to the communication type if the traffic of communication is above the first traffic sub-threshold; and A second setting unit is configured to set the number of receiving antennas among the WiFi antennas to a first number, and to set the number of transmitting antennas among the Wi-Fi antennas to the first number, if the traffic of communication is above the second traffic sub-threshold;

Where the first number is above or equal to a preset first number threshold.

Moreover some embodiments of the disclosure further provide a mobile device including an apparatus for setting antennas, the apparatus including:

One or more processors; and

A memory, where:

The memory is configured to store one or more computer readable program codes, and the one or more processors are configured to execute the one or more computer readable program codes to perform the operations of:

Functioning as a Wi-Fi relay to be connected with both a wireless access point and an electronic device, where the mobile device is provided with at least two Wi-Fi antennas to receive and transmit Wi-Fi data;

Determining a communication type of communication between the wireless access point and the electronic device; and Adjusting the number of receiving antennas and the number of transmitting antennas among the Wi-Fi antennas according to the communication type.

Figure 7:
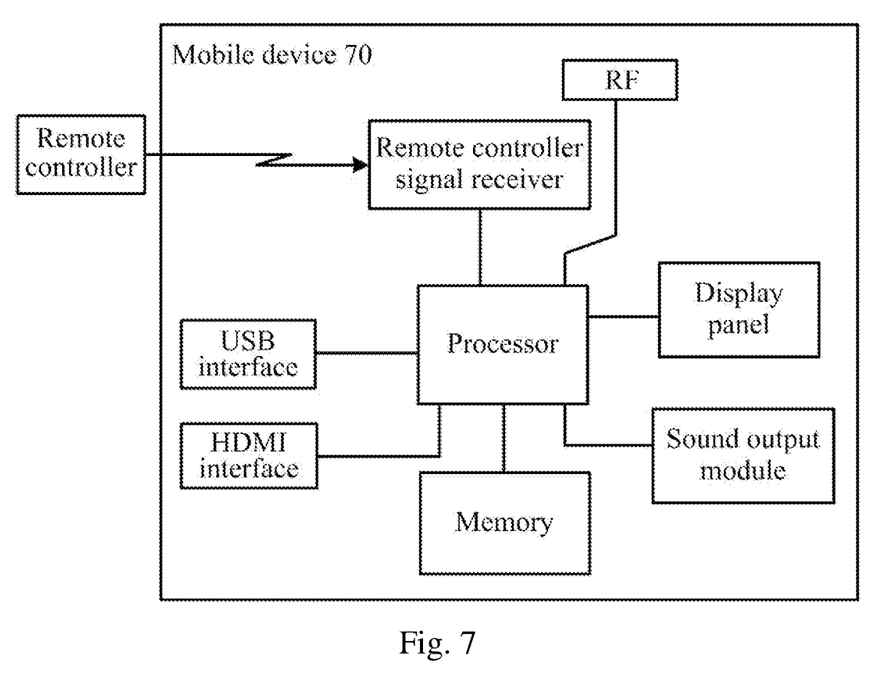
FIG. 7 is a schematic structural diagram of a mobile device according to an embodiment of the disclosure.

In an implementation, the mobile device according to the embodiment of the disclosure can be structured as illustrated in FIG. 7, where the mobile device 70 can include a memory, an input unit, an output unit, one or more processors, and other components. Those skilled in the art can appreciate that the mobile device will not be limited to the structure of the mobile device illustrated in FIG. 7, but can include more or less components than those as illustrated or some of the components can be combined or different components can be arranged, where:

The memory can be configured to store software programs and modules, and the processor can be configured to run the software programs and modules stored in the memory to thereby perform various function applications and data processing. The memory can include a high-speed random access memory and can further include a nonvolatile memory, e.g., at least one magnetic disk memory device, a flash memory device or another volatile solid memory device. Moreover the memory can further include a memory controller configured to provide an access of the processor and the input unit to the memory.

The processor is a control center of the mobile device, has the respective components of the entire mobile device connected by various interfaces and lines, and runs or executes the software programs and/or the modules stored in the memory and invokes the data stored in the memory to perform the various functions of the mobile device and process the data to thereby manage and control the mobile device as a whole. Optionally the processor can include one or more processing cores; and preferably the processor can be integrated with an application processor and a modem processor, where the application processor generally handles the operating system, the user interfaces, the applications, etc., and the modem processor generally handles wireless communication. As can be appreciated, the modem processor may not be integrated into the processor.

Of course the mobile device 70 further includes a WiFi module (not illustrated). The mobile device 70 can assist the user in transmitting and receiving an email, browsing a web page, accessing streaming media, etc., and also provide the user with a wireless broadband access to the Internet, through the WiFi module.

The mobile device 70 can include a TV and radio receiver, a High-Definition Multimedia (HDMI) interface, a USB interface, an audio and video input interface, and other input units, and the input units can further include a remote control receiver to receive a signal sent by a remote controller. Moreover the input units can further include a touch sensitive surface and other input devices, where the touch sensitive surface can be embodied in various types of resistive, capacitive, infrared, surface sound wave and other types, and the other input device can include but will not be limited to one or more of a physical keyboard, functional keys (e.g., a power-on or -off press key, etc.), a track ball, a mouse, a joystick, etc.

The output unit is configured to output an audio signal, a video signal, an alert signal, a vibration signal, etc. The output unit can include a display panel, a sound output module, etc. The display panel can be configured to display information input by a user or information provided to the user and various graphic user interfaces of the mobile device 70, where these graphic user interfaces can be composed of graphics, texts, icons, videos and any combination thereof. For example, the display panel can be embodied as a Liquid Crystal Display (LCD), an Organic Light-Emitting Diode (OLED), a flexible display, a 3D display, a CRT, a plasmas display panel, etc.

The mobile device 70 can further include at least one sensor (not illustrated), e.g., an optical sensor, a motion sensor and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the mobile device 70 moves to some position. The mobile device 70 can be further configured with a gyroscope, a barometer, a hygrometer, a thermometer, an infrared sensor and other sensors.

The mobile device 70 can further include an audio circuit (not illustrated), and a speaker and a transducer can provide an audio interface between the user and the mobile device 70. The audio circuit can convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted to another terminal, for example, or the audio data is output to the memory or further processing. The audio circuit may further include an earphone jack for communication between a peripheral earphone and the mobile device 70.

Moreover the mobile device 70 can further include a Radio Frequency (RF) circuit. The RF circuit can be configured to receive and transmit a signal. Typically the RF circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the mobile device 70 can further include a web cam, a Bluetooth module, etc.

Moreover some embodiments of the disclosure provide a computer readable storage medium, which can be a computer readable storage medium included in the memory in the embodiment above; or which can be a computer readable storage medium which is separate but not mounted into the electronic device. The computer readable storage medium stores one or more programs which can be executed by the one or more processors to perform the method according to any one of the embodiments above.

Since the embodiments of the apparatus are substantially similar to the embodiments of the method, the embodiments of the apparatus have been described in brief, and reference can be made to the description of the embodiments of the method for details of the embodiments of the apparatus.

The respective embodiments in the description have been described progressively, and each of the embodiments has been focused on its differences from the other embodiments, and the description of their commonalities can be applied to each other.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

It shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An apparatus for setting antennas of a mobile device, the apparatus comprising:
   one or more processors; and
   a memory, wherein:
   the memory is configured to store one or more computer readable program codes, and the one or more processors are configured to execute the one or more computer readable program codes to perform operations of:
   functioning, by the mobile device, as a Wi-Fi relay connected with both a wireless access point and an electronic device, wherein the mobile device includes at least two Wi-Fi antennas to receive and transmit Wi-Fi data;
   determining a communication type of communication between the wireless access point and the electronic device by counting proportions of respective protocols in data packets transmitted between the wireless access point and the electronic device, and determining the communication type of communication between the wireless access point and the electronic device based upon the proportions; and
   adjusting a number of receiving antennas and a number of transmitting antennas among the Wi-Fi antennas according to the determined communication type.

2. The apparatus according to claim 1, wherein adjusting the number of receiving antennas and the number of transmitting antennas among the Wi-Fi antennas according to the communication type comprises:
   determining whether traffic of communication between the wireless access point and the electronic device is above a preset traffic threshold; and
   adjusting the number of receiving antennas and/or the number of transmitting antennas among the Wi-Fi antennas according to a result of the determination and/or the communication type.

3. The apparatus according to claim 2, wherein the traffic threshold comprises a first traffic sub-threshold and a second traffic sub-threshold, and the first traffic sub-threshold is less than the second traffic sub-threshold; and
   adjusting the number of receiving antennas and/or the number of transmitting antennas among the Wi-Fi antennas according to the result of the determination and/or the communication type comprises:
   when the traffic of communication is above the first traffic sub-threshold, adjusting the number of receiving antennas and the number of transmitting antennas among the Wi-Fi antennas according to the communication type; and
   when the traffic of communication is above the second traffic sub-threshold, setting the number of receiving antennas among the WiFi antennas to a first number, and setting the number of transmitting antennas among the Wi-Fi antennas to the first number;
   wherein the first number is above or equal to a preset first number threshold.

4. The apparatus according to claim 1, wherein adjusting the number of receiving antennas and the number of transmitting antennas among the Wi-Fi antennas according to the communication type comprises:
   when the communication type is a first type, then setting the number of receiving antennas among the Wi-Fi antennas to a first number; and
   setting the number of transmitting antennas among the Wi-Fi antennas to the first number;
   wherein the first number is above or equal to a preset first number threshold, and the first type comprises a downlink type or an upload type.

5. The apparatus according to claim 1, wherein adjusting the number of receiving antennas and the number of transmitting antennas among the Wi-Fi antennas according to the communication type comprises:
   when the communication type is a second type, determining whether downlink traffic is above a preset download threshold; and
   if so, setting the number of receiving antennas among the Wi-Fi antennas to a first number, and setting the number of transmitting antennas among the Wi-Fi antennas to a second number;
   otherwise, setting the number of receiving antennas among the Wi-Fi antennas to the second number, and setting the number of transmitting antennas among the Wi-Fi antennas to the second number;
   wherein the first number is above or equal to a preset first number threshold, the second number is below or equal to a preset second number threshold, and the first number threshold is more than the second number threshold; and
   wherein the second type comprises a video browse type.

6. The apparatus according to claim 1, wherein adjusting the number of receiving antennas and the number of transmitting antennas among the Wi-Fi antennas according to the communication type comprises:
   when the communication type is a third type, then setting the number of receiving antennas among the Wi-Fi antennas to a second number; and
   setting the number of transmitting antennas among the Wi-Fi antennas to the second number;
   wherein the second number is below or equal to a preset second number threshold, and the third type comprises a webpage browse type.

7. A mobile device, comprising:
an apparatus for setting antennas, the apparatus comprising:
one or more processors; and
a memory, wherein:
the memory is configured to store one or more computer readable program codes, and the one or more processors are configured to execute the one or more computer readable program codes to perform operations of:
functioning, by the mobile device, as a Wi-Fi relay connected with both a wireless access point and an electronic device, wherein the mobile device includes at least two Wi-Fi antennas to receive and transmit Wi-Fi data;
determining a communication type of communication between the wireless access point and the electronic device by counting proportions of respective protocols in data packets transmitted between the wireless access point and the electronic device, and determining the communication type of communication between the wireless access point and the electronic device based upon the proportions; and
adjusting a number of receiving antennas and a number of transmitting antennas among the Wi-Fi antennas according to the determined communication type.

8. A method for setting antennas of a mobile device, the method comprising:
functioning, by the mobile device, as a Wi-Fi relay connected with both a wireless access point and an electronic device, wherein the mobile includes at least two Wi-Fi antennas to receive and transmit Wi-Fi data;
determining a communication type of communication between the wireless access point and the electronic device by counting proportions of respective protocols in data packets transmitted between the wireless access point and the electronic device, and determining the communication type of communication between the wireless access point and the electronic device based upon the proportions; and
adjusting a number of receiving antennas and a number of transmitting antennas among the Wi-Fi antennas according to the determined communication type.

9. The method according to claim 8, wherein adjusting the number of receiving antennas and the number of transmitting antennas among the Wi-Fi antennas according to the communication type comprises:
when the communication type is a second type, determining whether downlink traffic is above a preset download threshold; and
if so, setting the number of receiving antennas among the Wi-Fi antennas to a first number, and setting the number of transmitting antennas among the Wi-Fi antennas to a second number;
otherwise, setting the number of receiving antennas among the Wi-Fi antennas to the second number, and setting the number of transmitting antennas among the Wi-Fi antennas to the second number;
wherein the first number is above or equal to a preset first number threshold, the second number is below or equal to a preset second number threshold, and the first number threshold is more than the second number threshold; and
wherein the second type comprises a video browse type.

10. The method according to claim 8, wherein adjusting the number of receiving antennas and the number of transmitting antennas among the Wi-Fi antennas according to the communication type comprises:
when the communication type is a third type, setting the number of receiving antennas among the Wi-Fi antennas to a second number; and
setting the number of transmitting antennas among the Wi-Fi antennas to the second number;
wherein the second number is below or equal to a preset second number threshold, and the third type comprises a webpage browse type.

11. The method according to claim 8, wherein adjusting the number of receiving antennas and the number of transmitting antennas among the Wi-Fi antennas according to the communication type comprises:
determining whether traffic of communication between the wireless access point and the electronic device is above a preset traffic threshold; and
adjusting the number of receiving antennas and/or the number of transmitting antennas among the Wi-Fi antennas according to a result of the determination and/or the communication type.

12. The method according to claim 8, wherein adjusting the number of receiving antennas and the number of transmitting antennas among the Wi-Fi antennas according to the communication type comprises:
when the communication type is a first type, setting the number of receiving antennas among the Wi-Fi antennas to a first number; and
setting the number of transmitting antennas among the Wi-Fi antennas to the first number;
wherein the first number is above or at a preset first number threshold, and the first type comprises a downlink type or an upload type.

13. The method according to claim 11, wherein adjusting the number of receiving antennas and the number of transmitting antennas among the Wi-Fi antennas according to the communication type comprises:
when the communication type is a first type, setting the number of receiving antennas among the Wi-Fi antennas to a first number; and
setting the number of transmitting antennas among the Wi-Fi antennas to the first number;
wherein the first number is above or equal to a preset first number threshold, and the first type comprises a downlink type or an upload type.

14. The method according to claim 11, wherein adjusting the number of receiving antennas and the number of transmitting antennas among the Wi-Fi antennas according to the communication type comprises:
when the communication type is a second type, determining whether downlink traffic is above a preset download threshold; and
if so, setting the number of receiving antennas among the Wi-Fi antennas to a first number, and setting the number of transmitting antennas among the Wi-Fi antennas to a second number;
otherwise, setting the number of receiving antennas among the Wi-Fi antennas to the second number, and setting the number of transmitting antennas among the Wi-Fi antennas to the second number;
wherein the first number is above or at a preset first number threshold, the second number is below or equal to a preset second number threshold, and the first number threshold is more than the second number threshold; and
wherein the second type comprises a video browse type.

15. The method according to claim 11, wherein adjusting the number of receiving antennas and the number of transmitting antennas among the Wi-Fi antennas according to the communication type comprises:

when the communication type is a third type, setting the number of receiving antennas among the Wi-Fi antennas to a second number; and setting the number of transmitting antennas among the Wi-Fi antennas to the second number;

wherein the second number is below or equal to a preset second number threshold, and the third type comprises a webpage browse type.

16. The method according to claim 11, wherein the traffic threshold comprises a first traffic sub-threshold and a second traffic sub-threshold, and the first traffic sub-threshold is less than the second traffic sub-threshold; and adjusting the number of receiving antennas and/or the number of transmitting antennas among the Wi-Fi antennas according to the result of the determination and/or the communication type comprises:

when the traffic of communication is above the first traffic sub-threshold, adjusting the number of receiving antennas and the number of transmitting antennas among the Wi-Fi antennas according to the communication type; and when the traffic of communication is above the second traffic sub-threshold, setting the number of receiving antennas among the WiFi antennas to a first number, and setting the number of transmitting antennas among the Wi-Fi antennas to the first number;

wherein the first number is above or equal to a preset first number threshold.

* * * * *